June 4, 1957   F. P. WARNER ET AL   2,794,419
MOISTENING TROUGH FOR PRE-PASTED WALLPAPER
Filed Dec. 17, 1954
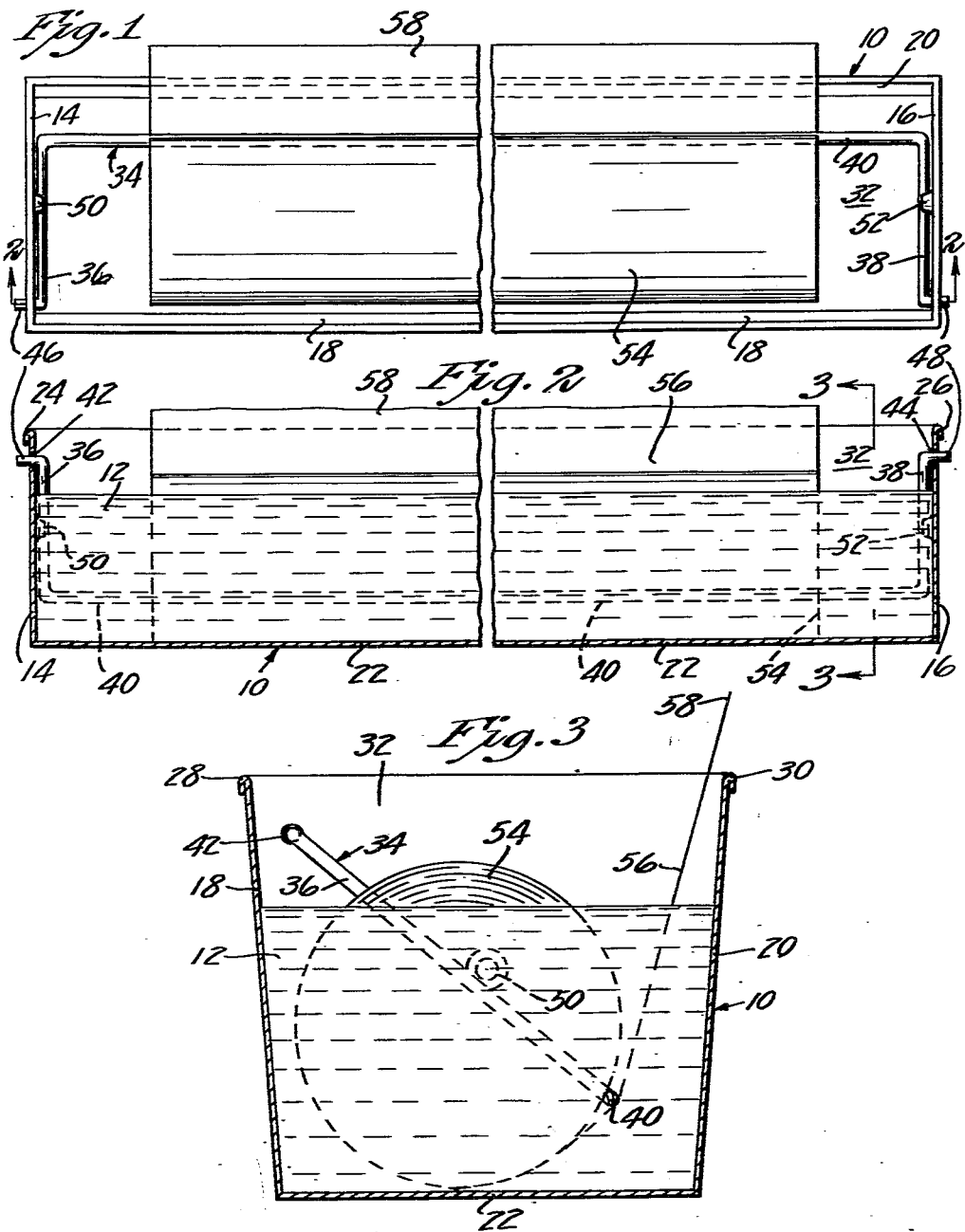
INVENTORS
FREDERICK P. WARNER
CARL E. CARLSON
BY
Merchant & Merchant
ATTORNEYS

2,794,419

MOISTENING TROUGH FOR PRE-PASTED WALLPAPER

Frederick P. Warner and Carl E. Carlson, Minneapolis, Minn., assignors to Warner Manufacturing Company, Minneapolis, Minn., a corporation of Minnesota Application December 17, 1954, Serial No. 476,049

2 Claims. (Cl. 118—419)

Our invention pertains to a moistening trough for wallpaper.

During recent years, household owners are doing much of their own papering without relying on the services of a professional paperhanger. Because the pasting of wallpaper is messy and sometimes difficult work, a pre-pasted wallpaper has been put on the market. This pre-pasted wallpaper eliminates the necessity of brushes, paste and a paste board, and makes it much easier for the home owner to hang his own wallpaper. This pre-pasted wallpaper must be thoroughly moistened prior to hanging to make the paste effective. Our invention is a novel and effective receptacle for moistening pre-pasted wallpaper; but it will be equally useful and effective for moistening non-pasted wallpaper which is to be applied to a pre-pasted wall.

It is an object of our invention to provide a novel moistening trough for wallpaper.

It is another object of our invention to provide a novel moistening trough for wallpaper which is easily portable and has means for insuring that the entire surface is properly moistened.

It is a further object of our invention to provide a novel moistening trough for wallpaper which is simple to operate and easily portable and which has contained therein a U-shaped bail, which acts to separate the individual circumferential wraps of paper as the rolled strip is unrolled, to maintain a tension in the paper to facilitate the unrolling of the wallpaper, so that it is immediately ready for hanging, and to prevent any unintentional lifting of the rolled strip of wallpaper from the trough.

These and other objects will be disclosed in the course of the following specification and claims, reference being had to the accompanying drawings wherein:

Fig. 1 is a top plan view of our invention showing a rolled strip of wallpaper positioned therein;

Fig. 2 is a section view taken along the line 2—2 of Fig. 1; and

Fig. 3 is a section view taken substantially along line 3—3 of Fig. 2.

Referring now with greater particularity to the drawings, the numeral 10 designates a five-sided trough adapted to be partially filled with water 12 and consisting of two end portions 14 and 16, two side portions 18 and 20, and a bottom portion 22. Top edges 24, 26, 28, and 30 of end portions 14 and 16 and side portions 18 and 20, respectively, define a rectangular opening 32 into trough 10. Each of the aforementioned top edges 24, 26, 28, and 30 are bent back as shown in Figs. 2 and 3 to form smooth and rounded edges which will not rip or injure the wallpaper in any manner.

A generally U-shaped bail 34 having generally parallel arms 36 and 38 connected by a generally horizontally disposed rod 40 extending between one end of each thereof, is pivotally secured to the end portions 14 and 16. This may be accomplished in any suitable manner; but as shown end portions 14 and 16 have oppositely disposed aligned apertures 42 and 44 formed therein, one aperture adjacent an upper corner of each end portion. Trunnions 46 and 48, formed at the opposite ends of arms 36 and 38 from their connection to rod 40, project laterally outwardly in opposite directions generally parallel to rod 40 and are journalled in apertures 42 and 44. Bail 34 is pivotally movable between two positions about the generally horizontal axis defined by trunnions 46 and 48. One of these positions is an elevated position of bail 34 in relation to trough 10 wherein the rod 40 thereof is disposed outside of the trough and not obstructive of the opening 32 and wherein arms 36 and 38 project generally upwardly. The operator may place arms 36 and 38 in engagement with the top edge 28 of side portion 18 to support bail 34 in its elevated position if desired. The second position of bail 34 positions rod 40 within trough 10 adjacent the bottom 22 and side portion 20 but upwardly and inwardly spaced from bottom 22 and side portion 20, respectively. A pair of inwardly projecting nubs 50 and 52 are secured approximately at the centers of end portions 14 and 16, respectively, and preferably as shown, are formed integrally therewith. Nubs 50 and 52 are adapted to maintain the second position of bail 34 by limiting its upward movement from inside the trough 10 toward its first defined elevated positon. At the second defined position of bail 34, rod 40 is disposed to contact the periphery of a roll of wallpaper 54 positioned within the trough 10 and to separate the outermost circumferential wraps of paper from the remainder of the roll.

The operation of our device is as follows. When bail 34 is in its first-defined elevated position as explained above, trough 10 is adapted to receive a rolled strip of wallpaper 54 which ordinarily has been cut to the proper length desired for immediate hanging. Bail 34 is then moved from this first-defined position toward its second-defined position; and this requires that the parallel arms 36 and 38 be forced past the inwardly projecting nubs 50 and 52. As bail 34 is moved from its first-defined position to its second-defined position, it separates the outermost circumferential wrap of paper 56 from the remainder of the roll in the manner shown in Fig. 3.

The operator now grasps the lateral extremity 58 of the outermost circumferential wrap of paper 56, first making certain that this area has been thoroughly moistened, and pulls the strip of paper upward and out of the trough 10. Rod 40 of bail 34 acts to separate the individual circumferential wraps of paper from the remainder of the roll as the strip of wallpaper is unrolled, and this insures a proper moistening of the entire strip of paper. Bail 34 acts to maintain tension in the strip of paper as it is unrolled within the trough 10, and also acts to retain the rolled strip of wallpaper in trough 10 which prevents any unintentional lifting of the roll out of the trough.

It will be obvious to those skilled in the art that our invention may be modified by many substitutions and equivalents and that this disclosure is intended to be illustrative only; and we intend it to be limited solely by the scope of the claims.

What we claim is:

1. A moistening trough for wallpaper comprising a trough adapted to be partially filled with water and consisting of two end portions and two side portions and a bottom portion, said trough having an opening defined by the top edges of said side and end portions, a pair of oppositely disposed inwardly projecting nubs each formed on a different one of said end portions, and a generally U-shaped bail comprising spaced arms and a generally horizontally disposed rod having a length approximately equal to the length of said trough pivotally connected to said trough at the free ends of said arms for swinging movements between two positions on a generally horizontal axis spaced from and parallel to said rod, at one position of said bail said rod being disposed outside of said trough and unobstructive of said opening to facilitate the insertion of said strip of wallpaper into said trough and at the second position of said bail said rod being operatively disposed within said trough adjacent and generally parallel to the bottom and one side portion of said trough, each of said nubs releasably engaging a different one of said arms at the second position of said bail for limiting upward movement of said bail out of said trough, whereby at the second position of said bail said rod is adapted to engage said strip of wallpaper to separate individual circumferential wraps of said wallpaper from the remainder of the roll and to maintain tension in said strip of wallpaper as it is unrolled within said trough and to prevent an unintentional lifting of said roll out of said trough.

2. A moistening trough for wallpaper comprising an open-topped trough adapted to be partially filled with water; a generally U-shaped member comprising a pair of oppositely disposed generally parallel spaced arms, a longitudinally extended rod generally normal to said arms being rigidly connected to said arms, and a pair of trunnions each rigid with the free end of a different one of said arms and projecting laterally outwardly in opposite directions generally parallel to said rod; said trough having a pair of oppositely disposed apertures formed in the side walls thereof each adapted to receive and journal a different one of said trunnions for pivotally connecting said U-shaped member to said trough for swinging movements about a horizontal axis; and a pair of oppositely disposed inwardly projecting nubs rigid with the side walls of said trough each adapted to engage a different one of said arms intermediate its ends for releasably limiting upward swinging movements of said U-shaped member in one direction, said rod being disposed longitudinally in said trough upwardly spaced from the bottom thereof and adjacent thereto and laterally offset from the center of said trough to be adjacent a side wall portion of said trough in inwardly spaced relationship therewith when the arms of said U-shaped member are in engagement with said nubs at which position said rod is restricted from generally upward swinging movement; whereby, at said position said rod is adapted to engage a rolled strip of wallpaper placed within said trough to separate the outermost circumferential wrap thereof from the remainder of the roll, and to maintain tension in said strip of wallpaper as it is unrolled within said trough and to prevent an unintentional lifting of said roll out of said trough.

References Cited in the file of this patent

UNITED STATES PATENTS

| | | |
|---|---|---|
| 904,668 | Arents | Nov. 4, 1908 |
| 1,016,755 | Loweree | Feb. 6, 1912 |
| 1,308,824 | Walker | July 8, 1918 |
| 1,705,255 | Kramer | Mar. 12, 1929 |
| 2,308,168 | Garson | Jan. 12, 1943 |

FOREIGN PATENTS

| | | |
|---|---|---|
| 15,284 | Great Britain | July 3, 1907 |